(12) United States Patent
Yun (10) Patent No.: US 12,330,393 B2
(45) Date of Patent: Jun. 17, 2025

(54) GLASS SUBSTRATE MULTILAYER STRUCTURE, METHOD OF PRODUCING THE SAME, AND FLEXIBLE DISPLAY PANEL INCLUDING THE SAME

(71) Applicants: SK Innovation Co., Ltd., Seoul (KR); SK ie technology Co., Ltd., Seoul (KR)

(72) Inventor: Cheol Min Yun, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 550 days.

(21) Appl. No.: 17/412,795

(22) Filed: Aug. 26, 2021

(65) Prior Publication Data

US 2022/0072826 A1    Mar. 10, 2022

(30) Foreign Application Priority Data

Sep. 4, 2020 (KR) ........................ 10-2020-0113257

(51) Int. Cl.
| | |
|---|---|
| B32B 17/06 | (2006.01) |
| B32B 27/30 | (2006.01) |
| B32B 27/38 | (2006.01) |
| C03C 17/32 | (2006.01) |
| C09D 135/02 | (2006.01) |
| C09D 163/00 | (2006.01) |
| G06F 1/16 | (2006.01) |

(52) U.S. Cl.
CPC ............ *B32B 17/06* (2013.01); *C03C 17/326* (2013.01); *C09D 135/02* (2013.01); *C09D 163/00* (2013.01); *B32B 27/308* (2013.01); *B32B 27/38* (2013.01); *B32B 2307/536* (2013.01); *B32B 2307/558* (2013.01); *B32B 2307/7376* (2023.05); *B32B 2457/20* (2013.01); *G06F 1/1652* (2013.01)

(58) Field of Classification Search
None
See application file for complete search history.

(56) References Cited

U.S. PATENT DOCUMENTS

2019/0203066 A1    7/2019   Onomichi et al.

FOREIGN PATENT DOCUMENTS

| | | |
|---|---|---|
| JP | 2018040974 A | 3/2018 |
| JP | 2018048347 A | 3/2018 |
| KR | 1020040036218 A | 4/2004 |
| KR | 20110104662 A | 9/2011 |
| KR | 1020130084102 A | 7/2013 |
| KR | 1020170113815 A | 10/2017 |
| KR | 1020200020593 A | 2/2020 |
| WO | WO-2018193979 A1 * | 10/2018 |

OTHER PUBLICATIONS

Shibamoto et al., WO-2018193979-A1, Oct. 25, 2018 (machine translation) (Year: 2018).*

* cited by examiner

*Primary Examiner* — Cheng Yuan Huang
(74) *Attorney, Agent, or Firm* — The Webb Law Firm (57) ABSTRACT

Provided are a glass multilayer structure, a method of producing the same, and a flexible display panel including the same. More particularly, a glass substrate multilayer structure including a flexible glass substrate; and a functional layer formed on at least one surface of the flexible glass substrate. The functional layer is a phase-separated layer formed by a single coating and a flexible display panel including the same are provided.

10 Claims, 3 Drawing Sheets

GLASS SUBSTRATE MULTILAYER STRUCTURE, METHOD OF PRODUCING THE SAME, AND FLEXIBLE DISPLAY PANEL INCLUDING THE SAME

CROSS-REFERENCE TO RELATED APPLICATION

This application claims priority to Korean Patent Application No. 10-2020-0113257 filed Sep. 4, 2020, the disclosure of which is hereby incorporated by reference in its entirety.

BACKGROUND OF THE INVENTION

Field of the Invention

The following disclosure relates to a glass substrate multilayer structure, a method of producing the same, and a flexible display panel including the same.

Description of Related Art

In recent years, thinner display devices are required with the development of mobile devices such as smart phones and tablet PCs, and among them, a flexible display device which may be curved or foldable when a user wants, or a flexible display device of which the manufacturing process includes a curving or folding is receiving attention.

Glass or tempered glass which is a material having excellent mechanical properties is generally used for a conventional window for displays, but glass has no flexibility and results in a higher weight of a display device due to its weight.

In order to solve the problem described above, a technology to make a flexible glass substrate thinner has been developed, but is not sufficient for implementing flexible properties capable of being curved or bent, and the problem of being easily broken by an external impact has currently yet to be solved.

Efforts to solve the problems by forming a functional layer such as a shatter-proof layer or a hard coating layer on a flexible glass thin film have been made, but the functional layer as such is generally laminated by interposing an acrylic resin adhesive, thereby increasing the overall thickness and weight of the laminate and also increases manufacturing costs as a process step is increased.

Accordingly, by allowing layers having further increased adhesion between functional layers while having a smaller thickness and performing functions of a shatter-proof layer and a hard coating layer by a single coating process to be self-produced by phase separation, development of a new type of flexible glass substrate multilayer structure formed by phase separation of the shatter-proof layer and the hard coating layer is needed while simplifying the process. In addition, development of a new flexible glass substrate multilayer structure not only having excellent flexibility such as not easily causing cracks in thousand times of folding and unfolding together with process simplification and a thickness decrease but also having further improved durability such as impact resistance and shatter resistance and allowing reduction of manufacturing costs by process simplification while having excellent thermal resistance and optical properties is currently needed.

SUMMARY OF THE INVENTION

An embodiment of the present invention may be realized by providing a new type of flexible glass substrate multilayer structure which is formed by separating a shatter-proof layer and a hard coating layer by phase separation by a single coating process. Thus, an embodiment of the present invention may have excellent durability and shatter resistant properties, and thus, may secure a user's safety.

Another embodiment of the present invention may be realized by providing a flexible glass substrate multilayer structure in which a shatter-proof layer having sufficient adhesiveness with a flexible glass substrate is formed only by a single coating and simultaneously, a hard coating layer formed by separating the shatter-proof layer by phase separation is formed, and a method of producing the same.

Another embodiment of the present invention may be realized by providing a glass substrate multilayer structure which may be applied to a flexible display device, since it has an intermediate layer having excellent adhesiveness with a flexible glass substrate and a hard coating layer produced by phase separation, and has excellent surface properties of being not pressed, nicked, or cracked even when a steel ball is dropped thereon from a high height in a ball drop test and flexible properties capable of being curved or bent at the same time, and thus, glass is not broken or does not crack even when it is repeatedly folded or curved.

Thus, another embodiment of the present invention may be realized by providing a method of producing a glass substrate multilayer structure which may form a functional layer capable of implementing conventional functions of a shatter-proof layer and a hard coating layer at once, by forming a phase-separated functional layer by a single coating on a flexible glass substrate. Furthermore, another embodiment of the present invention may be realized by providing a glass substrate multilayer structure produced by the above production method, having a functional layer having improved adhesion between functional layers and being capable of being implemented with a smaller thickness.

Another embodiment of the present invention may be realized by providing a flexible glass substrate multilayer structure providing physical properties of a pencil hardness according to ASTM D3363 of, for example, 3H or more, 4H or more, or 5H or more and excellent adhesiveness with glass.

Still another embodiment of the present invention may be realized by providing a glass substrate multilayer structure allowing a smaller thickness, a simplified production process, and reduced manufacturing costs, and a method of producing the same.

In one general aspect, a flexible glass substrate multilayer structure includes: a flexible glass substrate; and a functional layer formed on at least one surface of the flexible glass substrate, wherein the functional layer is phase-separated in a drying or curing process after a single coating and formed into two or more layers.

In an exemplary embodiment of the present invention, the functional layer may comprise a shatter-proof layer being in contact with the glass substrate to have a function of preventing shatter upon damage and a hard coating layer being formed on the shatter-proof layer by phase separation and having high surface hardness properties.

In an exemplary embodiment of the present invention, the functional layer may be formed by applying a mixture comprising an acrylic compound and a silane-based compound.

In an exemplary embodiment of the present invention, the glass substrate may have a thickness of 1 to 100 μm.

In an exemplary embodiment of the present invention, the functional layer may have a thickness of 1 μm to 10 μm.

In an exemplary embodiment of the present invention, the glass substrate multilayer structure may have a pencil hardness according to ASTM D3363 of 3H to 5H.

In an exemplary embodiment of the present invention, the functional layer may be formed by mixing an acrylic compound and an alicyclic epoxy silsesquioxane-based compound.

In another general aspect, a method of producing a flexible glass substrate multilayer structure includes: applying a composition for forming a functional layer on one surface of a flexible glass substrate; and curing the applied composition for forming a functional layer to form a phase-separated functional layer.

In an exemplary embodiment of the present invention, the composition for forming a functional layer may be formed by applying a mixture of an acrylic compound and an alicyclic epoxidized silsesquioxane-based compound.

In an exemplary embodiment of the present invention, the curing may be thermal curing after light irradiation.

In still another general aspect, a flexible display panel includes the glass substrate multilayer structure.

Other features and aspects will be apparent from the following detailed description, the drawings, and the claims.

DESCRIPTION OF THE INVENTION

The terms used in the present invention have the same meanings as those commonly understood by a person skilled in the art. In addition, the terms used herein are only for effectively describing a certain specific example, and are not intended to limit the present invention.

The singular form used in the specification of the present invention and the claims appended thereto may be intended to also include a plural form, unless otherwise indicated in the context.

Throughout the present specification describing the present invention, unless explicitly described to the contrary, "comprising" any elements will be understood to imply further inclusion of other elements rather than the exclusion of any other elements.

The term "flexible" in the present invention refers to being curved, bent, or folded.

The inventors of the present invention conducted many studies for solving the above problems, and as a result, found that as an example, a mixed solution of a first solution including an acrylic compound and a second solution including an alicyclic epoxidized silsesquioxane-based compound is applied on at least one surface of a flexible glass substrate and photocuring and/or thermal curing is/are performed, thereby implementing both functions of a shatter-proof layer and a hard coating layer on the glass substrate by phase separation.

When the mixed solution according to an exemplary embodiment of the present invention is coated and dried and/or cured, an acrylic resin layer, an epoxysilane resin layer, and a mixed layer thereof between the layers are formed at once with curing by phase separation, thereby having bending properties, adhesiveness, and excellent ball drop properties.

In addition, the present inventors found a glass substrate multilayer structure which has excellent flexible properties while having significantly improved shatter resistance, impact resistance, and optical properties, and thus, is appropriate for being applied as a cover window of a flexible display panel, thereby completing the present invention.

In an exemplary embodiment of the present invention, the functional layer has a multilayer structure in which an epoxy-based silane resin layer is formed on a flexible glass substrate by phase separation, an acrylic resin layer is formed on the epoxy-based silane resin layer, and also a mixed layer thereof is formed in an interface between the epoxy-based silane resin layer and the acrylic resin layer, and thus, the functional layer shows surprising effects of having excellent interlayer adhesion, having an excellent surface hardness of a pencil hardness according to ASTM D3363 of 3H or more as surface properties, having excellent adhesion with a flexible display element, and being not pressed, nicked, or broken even when a ball is dropped thereon from a high height in a ball drop test without a loss of properties of being curved or folded.

Hereinafter, each constituent element of the present invention will be described in more detail with reference to drawings. However, these are only illustrative, and the present invention is not limited to the specific embodiments which are illustratively described by the present invention.

The glass substrate multilayer structure according to an exemplary embodiment of the present invention is formed by applying a mixed solution of a first solution and a second solution on a glass substrate, and then performing photocuring and thermal curing to form an epoxy-based silane resin layer, an acrylic resin layer, and a mixed layer between the layers.

That is, in the glass substrate multilayer structure of an exemplary embodiment, a multilayer structure is formed in an order of a glass substrate, an epoxy-based silane resin layer, a mixed layer, and a urethane acrylic resin layer.

The glass substrate multilayer structure according to an exemplary embodiment of the present invention may have a pencil hardness according to ASTM D3363 of 3H or more, specifically 4H or more, and more specifically 5H or more.

In addition, the glass substrate multilayer structure may have a shatter resistance by a ball drop test of 1 m or more, more specifically 1.5 m or more, and still more specifically 2 m or more. Here, the ball drop test refers to a state of no pressing, nicks, or cracks on the surface when a steel ball having a weight of 130 g and a diameter of 30 mm was dropped thereon.

The glass substrate multilayer structure according to an exemplary embodiment of the present invention may provide excellent surface hardness properties of a pencil hardness according to ASTM D3363 of 3H or more and excellent surface properties of being not pressed, nicked, or cracked in a ball drop test from a high height of 1 m or more, without damaging excellent flexible properties or foldable characteristics of a glass substrate, by adopting a mixed solution of a first solution including an acrylic compound and a second solution including an epoxidized silsesquioxane-based compound, specifically an alicyclic epoxidized silsesquioxane compound as a material for forming a functional layer, and adopting a production method of performing photocuring and/or thermal curing.

In addition, the glass substrate multilayer structure easily implements flexible properties with excellent flexibility and has excellent impact resistance and shatter resistant properties, thereby securing user's safety, and is transparent with excellent optical properties to be applied as a window cover of a flexible display panel.

Hereinafter, a flexible glass substrate forming the glass substrate multilayer structure according to an exemplary embodiment of the present invention and a functional layer formed on at least one surface of the flexible glass substrate will be described in more detail.

<Flexible Glass Substrate>

A flexible glass substrate refers to a foldable or curved glass substrate, may function as a window of a display device, and has good durability and excellent surface smoothness and transparency.

In an exemplary embodiment of the present invention, the flexible glass substrate is not limited as long as it contains glass, but specifically, may be selected from common glass, soda lime glass, tempered glass, and the like.

In an exemplary embodiment of the present invention, the glass substrate multilayer structure may be formed on one surface of a flexible display panel or may be curved or folded in response to curving or folding. Here, in order to deform the glass substrate multilayer structure to a degree of being bent with a relatively small radius of curvature or being roughly folded, for example, the flexible glass substrate may be formed as an ultra-thin glass substrate.

In an exemplary embodiment of the present invention, the flexible glass substrate may be an ultra-thin glass substrate, and may have a thickness of 100 μm or less, specifically 1 to 100 μm, and more specifically 10 to 100 μm.

In an exemplary embodiment of the present invention, the flexible glass substrate may further include a chemical reinforcement layer, and the chemical reinforcement layer may be formed by performing a chemical reinforcement treatment on any one surface or more of a first surface and a second surface of a glass substrate included in the flexible glass substrate, thereby improving the strength of the flexible glass substrate.

There are various methods of forming a chemical reinforcement-treated ultra-thin flexible glass substrate, but as an example, a method of preparing an original long glass having a thickness of 100 μm or less, processing the glass into a predetermined shape by cutting, chamfering, sintering, and the like, and subjecting the processed glass to a chemical reinforcement treatment may be included. As another example, an original long glass having a normal thickness is prepared and slimmed into a thickness of 100 μm or less, and then may be subjected to shape processing and a chemical reinforcement treatment sequentially. Here, slimming may be performed by any one or both of a mechanical method and a chemical method.

<Functional Layer>

In an exemplary embodiment of the present invention, a functional layer may implement both a function of a layer absorbing energy generated in damage of the flexible glass substrate to prevent shards of a glass substrate from being shattered and a function of protection from external physical and chemical damage, and may be a layer for imparting excellent surface properties, optical properties, and optical properties.

In an exemplary embodiment of the present invention, the glass substrate multilayer structure on which the functional layer is formed may provide excellent surface properties of being not pressed, nicked, or cracked even when a steel ball having a weight of 130 g and a diameter of 30 mm is dropped thereon from a height of 1 m or more.

Moreover, the functional layer may provide excellent surface hardness properties of a pencil hardness according to ASTM D3363 of 3H or more, specifically 4H or more, and more specifically 5H or more.

In an exemplary embodiment of the present invention, the functional layer may include an acrylic resin layer, an epoxy-based silane resin layer, and a mixed layer thereof.

The mixed layer may be, more specifically, in a state in which a urethane acrylic compound and an epoxy-based silane compound are mixed with each other or formed so that an acrylic compound layer and an epoxy-based silane resin compound have a concentration gradient in a thickness direction. When the mixed layer has a concentration gradient, a shatter-proof layer and a hard coating layer including, for example, 70% or more, 80% or more, 90% or more, or 100% of each component forming each layer may be cured.

In an exemplary embodiment of the present invention, the functional layer may be formed by curing a composition for forming a functional layer which is a mixed solution of a first solution including an acrylic compound and a second solution including an alicyclic epoxidized silsesquioxane-based compound described later. More specifically, the functional layer may be formed into two or more layers which are phase-separated by a single coating (application) of the composition for forming a functional layer.

In an exemplary embodiment of the present invention, the composition for forming a functional layer may include a mixed solution of the first solution and the second solution. Here, the first solution and the second solution may be mixed at a weight ratio of, for example, 2:1 to 1:4, 1.5:1 to 1:3.5, or 1:1 to 1:3. By having the mixing ratio in the above range, the functional layer produced may have excellent surface hardness and shatter resistant properties.

Hereinafter, the first solution and the second solution will be described in detail.

<First Solution>

In an exemplary embodiment of the present invention, the first solution may include an acrylic compound, a photopolymerization initiator or a thermal polymerization initiator, and a solvent.

In an exemplary embodiment of the present invention, the acrylic compound may include any one or two or more selected from a polyfunctional (meth)acrylate oligomer, a polyfunctional (meth)acrylate monomer, a (meth)acrylate-based monomer, methacrylic acid, acrylic acid, and the like.

The polyfunctional acrylate oligomer may be a polyfunctional (meth)acrylate-based oligomer of various forms such as ester-based, urethane-based, and ether-based, and the polyfunctional monomer may refer to a monomer having 2 to 6 (meth)acrylate groups.

An example of the type of polyfunctional monomer includes acrylate monomers such as trimethylolpropane triacrylate (TMPTA), tripropylene glycol diacrylate (TPGDA), dipentaerythritol hexaacrylate (DPHA), di-trimethylolpropane triacrylate (DMPTA), dipentaerythritol pentaacrylate (DEPTA), and pentaerythritol tetraacrylate (PETA).

An example of a commercialized product of the acrylic compound of the first solution includes PU9020 (containing 30% of butyl acetate, Miwon Specialty Chemical Co., Ltd.), UA5095X2 (Miwon Specialty Chemical Co., Ltd.), and the like, but is not limited thereto.

As an example of the initiator, a known thermal polymerization initiator may be used without limitation, specifically, a peroxide-based or azo-based initiator may be used, and more specifically, benzoyl peroxide, 2,2'-azobis(N-butyl-2-methylpropionamide), and the like may be used, but is not limited thereto. The photopolymerization initiator is used without limitation as long as it is a known photopolymerization initiator, and an example of the photoinitiator may be an acetophenone-based compound.

The acetophenone-based compound may include at least one or more selected from the group consisting of 2-hydroxy-2-methyl-1-phenylpropan-1-one, 1-(4-isopropylphenyl)-2-hydroxy-2-methylpropan-1-one, 4-(2-hydroxyethoxy)-phenyl (2-hydroxy)propyl ketone, 1-hydroxycyclohexylphenyl ketone, 2,2-dimethoxy-2-phenyl acetophenone, 2-methyl-(4-methylthiophenyl)-2-morpholino-1-propan-1-one (Irgacure907), 1-hydroxy-cyclohexyl-phenyl-ketone (Irgacure184), and 2-benzyl-2-dimethylamino-1-(4-morpholinophenyl)-butan-1-one, but is not limited thereto.

The solvent may be any one or a mixed solution of two or more selected from the group consisting of methylethylketone, ethylacetate, cyclohexane, methyl isobutyl ketone, isopropylalcohol, polypropylene glycol, polypropylene glycol methyl ether acetate, methoxytriglycol, ethoxytriglycol, butoxytriglycol, 1-butoxyethoxy-2-propanol, and phenyl glycol ether.

<Second Solution>

In an exemplary embodiment of the present invention, the second solution may be a curable silane compound. An example of the curable silane compound may include an epoxidized silsesquioxane-based compound, a crosslinking agent, and a solvent.

In an exemplary embodiment of the present invention, the epoxidized silsesquioxane-based compound may be an alicyclic epoxidized silsesquioxane (epoxidized cycloalkyl substituted silsesquioxane)-based compound.

An example of the alicyclic epoxidized silsesquioxane-based compound may include a trialkoxysilane compound-derived repeating unit represented by the following Chemical Formula 1:

A-Si(OR)$_3$    [Chemical Formula 1]

wherein A is a C1 to C10 alkyl group substituted by a C2 to C7 epoxy group, R is independently of each other a C1 to C10 alkyl group, and the carbon of the C1 to C10 alkyl group may be substituted by oxygen.

In Chemical Formula 1, an example of the epoxy group may be a cycloalkyl-fused epoxy group, and a specific example of the epoxy group may be a cyclohexylepoxy group and the like.

Here, a specific example of the alkxoysilane compound may be one or more of 2-(3,4-epoxycyclohexyl)methyltrimethoxysilane, 2-(3,4-epoxycyclohexyl)ethyltrimethoxysilane, 2-(3,4-epoxycyclohexyl)methyltriethoxysilane, 2-(3,4-epoxycyclohexyl)ethyltriethoxysilane, and 3-glycidoxypropyltrimethoxysilane, but the present invention is not limited thereto.

In addition, in an exemplary embodiment of the present invention, the silsesquioxane-based compound also includes a dialkoxysilane compound-derived repeating unit represented by the following Chemical Formula 2, together with a trialkoxysilane compound-derived repeating unit represented by Chemical Formula 1. In this case, the silsesquioxane-based compound may be prepared by mixing 0.1 to 100 parts by weight of the dialkoxysilane compound with respect to 100 parts by weight of the trialkoxysilane compound and performing condensation polymerization.

A-SiR$_a$(OR)$_2$    [Chemical Formula 2]

wherein R$_a$ is a linear or branched alkyl group selected from C1 to C5, and A and R are as defined in Chemical Formula 1.

A specific example of the compound of Chemical Formula 2 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, 2-(3,4-epoxycyclohexyl)ethylmethyldiethoxysilane, and the like, but is not limited thereto, and the compound may be used alone or in combination of two or more.

A method of polymerizing the alicyclic epoxidized silsesquioxane-based compound is not limited as long as it is known in the art, but for example, the compound may be prepared by hydrolysis and condensation reactions between alkoxy silanes represented by Chemical Formulae 1 and 2 in the presence of water. Here, the hydrolysis reaction may be promoted by including a component such as an inorganic acid. In addition, the epoxysilane-based resin may be formed by polymerizing a silane compound including an epoxycyclohexyl group.

Here, the weight average molecular weight of the alicyclic epoxidized silsesquioxane-based compound may be, for example, 1,000 to 20,000 g/mol, 1,000 to 18,000 g/mol, or 2,000 to 15,000 g/mol. Here, the weight average molecular weight is measured using GPC.

When the compound has the weight average molecular weight in the above range, the second solution has an appropriate viscosity and may have excellent miscibility with the first solution described above.

In an exemplary embodiment of the present invention, the crosslinking agent forms a crosslink with the epoxidized silsesquioxane-based compound, and a specific example thereof may include a compound represented by the following Chemical Formula 3. The compound represented by Chemical Formula 3 is an alicyclic epoxy compound which is the same as the epoxy unit having the structures of Chemical Formulae 1 and 2, may promote crosslinking and maintain bending properties, does not damage transparency.

[Chemical Formula 3]

wherein R$_1$ and R$_2$ are independently of each other hydrogen or a linear or branched alkyl group having 1 to 5 carbon atoms, and X is a direct bond; a carbonyl group; a carbonate group; an ether group; a thioether group; an ester group; an amide group; a linear or branched alkylene group, an alkylidene group, or an alkoxylene group having 1 to 18 carbon atoms; a cycloalkylene group or a cycloalkylidene group having 1 to 6 carbon atoms; or a linking group thereof.

Here, a "direct bond" refers to a structure which is directly bonded without any functional group, and for example, in Chemical Formula 3, may refer to two cyclohexanes directly connected to each other. In addition, a "linking group" refers to two or more substituents described above being connected to each other. In addition, in Chemical Formula 3, the substitution positions of $R_1$ and $R_2$ are not particularly limited, but when the carbon connected to X is set at position No. 1 and the carbons connected to an epoxy group are set at position Nos. 3 and 4, $R_1$ and $R_2$ may be substituted at position No. 6.

The content of the crosslinking agent is not particularly limited, and for example, may be included at 1 to 150 parts by weight with respect to 100 parts by weight of the silsesquioxane compound.

The second solution may further include an additional thermal curing agent, the thermal curing agent may include sulfonium salt-based, amine-based, imidazole-based, acid anhydride-based, amide-based thermal curing agents, and the like, as an example, and these may be used alone or in combination of two or more.

The content of the thermal curing agent is not particularly limited, and for example, the thermal curing agent may be included at 5 to 30 parts by weight with respect to 100 parts by weight of the epoxy silsesquioxane-based compound, but is not limited thereto.

In an exemplary embodiment of the present invention, a non-limiting example of the solvent may include alcohol-based solvents such as methanol, ethanol, isopropanol, butanol, methyl cellosolve, and ethyl cellosolve; ketone-based solvents such as methyl ethyl ketone, methyl butyl ketone, methyl isobutyl ketone, diethyl ketone, dipropyl ketone, and cyclohexanone; hexane-based solvents such as hexane, heptane, and octane; benzene-based solvents such as benzene, toluene, and xylene; and the like. These may be used alone or in combination of two or more.

In an exemplary embodiment of the present invention, the solvent may be included in a remaining amount excluding the amount of the remaining components in the total weight of the composition.

In addition, in an exemplary embodiment of the present invention, as the second solution, various epoxy compounds may be further added in addition to the compounds of the above Chemical Formulae, as long as the properties of the present invention are achieved, and the content may not exceed 20 parts by weight with respect to 100 parts by weight of the compound of Chemical Formula 3.

In an exemplary embodiment of the present invention, the epoxy-based monomer may be included at 10 to 80 parts by weight with respect to 100 parts by weight of the second solution. Within the content range, viscosity may be adjusted, a thickness may be easily adjusted, a surface is uniform, defects in a thin film do not occur, and hardness may be sufficiently achieved, but the present invention is not limited thereto.

In an exemplary embodiment of the present invention, the second solution may further include inorganic particles, and the inorganic particles may include any one or two or more selected from the group consisting of silica and metal oxides.

A specific example of the metal oxide may include alumina, titanium oxide, and the like, and though it is not limited thereto, for example, silica may be used in terms of compatibility with other components of the second solution. These may be used alone or in combination of two or more. In addition, the inorganic particles may further include particles selected from a hydroxide such as aluminum hydroxide, magnesium hydroxide, and potassium hydroxide; metal particles such as gold, silver, copper, nickel, and an alloy thereof; conductive particles such as carbon, carbon nanotube, and fullerene; glass; ceramic; and the like, but are not limited thereto.

In the present embodiment, the inorganic particles may have an average particle diameter of 1 to 200 nm, and specifically 5 to 180 nm, and within the average particle diameter range, inorganic particles having two or more different average particle diameters may be used, but are not limited thereto. In addition, the second solution may further include an additional lubricant, and as a specific example of the lubricant, waxes such as polyethylene wax, paraffin wax, synthetic wax, or Montan wax; synthetic resins such as silicon-based resin and fluorine-based resin; and the like may be used, and these may be used alone or in combination of two or more, but are not limited thereto.

<Method of Producing Glass Substrate Multilayer Structure>

Hereinafter, the method of producing a glass substrate multilayer structure according to an exemplary embodiment of the present invention will be described in detail.

The method of producing a glass substrate multilayer structure according to an exemplary embodiment of the present invention may include: applying a composition for forming a functional layer on one surface of a flexible glass substrate; and curing the applied composition for forming a functional layer to form a phase-separated functional layer.

In an exemplary embodiment of the present invention, a composition for forming a functional layer in the step of applying the composition for forming a functional layer will be described.

In an exemplary embodiment of the present invention, an example of the composition for forming a functional layer may be a mixed solution of a first solution including an acrylic compound and a second solution including an alicyclic epoxidized silsesquioxane-based compound. The first solution and the second solution may be those using the solutions described above, in which a mixing ratio of the first solution and the second solution may be 2:1 to 1:4, 1.5:1 to 1:3.5, or 1:1 to 1:3, as a weight ratio. By having the mixing ratio in the above range, the functional layer produced may have excellent surface hardness and shatter resistant properties.

A coating layer is formed by applying the composition for forming a functional layer described above on a flexible glass substrate. Thereafter, a dualized functional layer may be formed by performing a curing process.

A method of application is not limited, but various methods such as bar coating, dip coating, die coating, gravure coating, comma coating, slit coating, or a mixed method thereof may be used.

In an exemplary embodiment of the present invention, the curing may include performing thermal curing sequentially.

Figure 1:
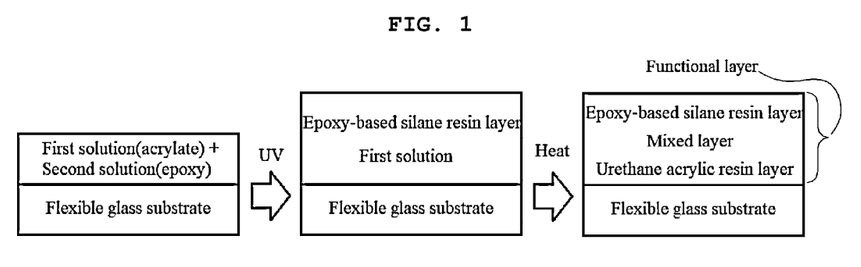
FIG. 1 is a schematic diagram showing a method of producing a glass substrate multilayer structure according to an exemplary embodiment of the present invention.

Hereinafter, the glass substrate multilayer structure according to an exemplary embodiment of the present invention will be described with reference to the schematic diagram of FIG. 1.

The curing may implement a functional layer having a dualized structure separated into two or more layers by performing a sequential curing process of thermal curing after photocuring. More specifically, the functional layer having a dualized structure has a state in which an epoxy-based silane resin layer formed on the surface of the coating layer and the first solution on the lower portion coexist, after photocuring, and the first solution may be cured by thermal curing to form a functional layer having a structure of an acrylic resin layer, an epoxy-based silane resin layer, and a mixed layer thereof.

The photocuring may be performed by light irradiation and the type of light is not limited, but for example, ultraviolet rays (UV) may be used. Here, a light irradiation quantity may be 20 to 600 mJ/cm$^2$, specifically 50 to 500 mJ/cm$^2$, and an irradiation time may be 30 seconds to 20 minutes, specifically 1 minute to 15 minutes.

As a non-limiting exemplary embodiment, the photocuring may further include a drying process before light irradiation, and the drying may be performed at 30° C. to 70° C. for 1 to 30 minutes, but the present invention is not limited thereto.

The thermal curing may be a heat treatment at a temperature of room temperature to 250° C., more specifically, a heat treatment at a temperature of 40° C. to 200° C., the number of heat treatments may be one or more, and the heat treatment may be performed once or more at the same temperature or in a different temperature range. In addition, the heat treatment time may be 1 minute to 60 minutes, but is not limited thereto.

<Flexible Display Panel>

In an exemplary embodiment of the present invention, a flexible display panel or a flexible display device including the glass substrate multilayer structure according to the exemplary embodiment as a window cover may be provided.

In an exemplary embodiment of the present invention, the glass substrate multilayer structure in the flexible display device may be used as an outermost surface window substrate of the flexible display panel. The flexible display device may be various image display devices such as a common liquid crystal display device, an electroluminescent display device, a plasma display device, and a field emission display device.

Hereinafter, the present invention will be described in more detail with reference to the Examples and Comparative Examples. However, the following Examples and Comparative Examples are only an example for describing the present invention in more detail, and do not limit the present invention in any way.

Hereinafter, the physical properties were measured as follows:

1) Pencil Hardness

A pencil hardness on the surface of the glass substrate multilayer structure produced in the Examples and the Comparative Examples was measured using pencils by hardness (Mitsubishi Pencil Co., Ltd.) under a load of 1 kg using a pencil hardness tester (Kipae E&T Co. Ltd.), in accordance with ASTM D3363.

2) Evaluation of Shatter Resistant Properties (Ball Drop Test)

Evaluation was performed at room temperature using a ball drop measuring instrument from Nano Hitec. A multilayer structure was placed on a sample support, a steel ball having a weight of 130 g and a diameter of 30 mm was dropped on a glass substrate multilayer structure sample produced in the following Examples and Comparative Example 1 from a height of 1 m, and then the state of the glass substrate multilayer structure was evaluated according to the following criteria. The ball drop was measured by dropping the ball on the surface having a hard coating layer formed thereon.

<Evaluation Criteria>
◎: no nicks and pressing
○: nicks and pressing present
x: Broken (not shattered)
▲: different results in two evaluations

[Preparation Example 1] Preparation of First Solution (A) Including Acrylic Compound 171 g of PU9020 (containing 30% of butyl acetate, Miwon Specialty Chemical Co., Ltd.) and 280 g of UA5095X2 (Miwon Specialty Chemical Co., Ltd.) were mixed, and then 140 g of methylethyl ketone (MEK) was added so that a solid content was 70 wt % and stirring was performed for 5 hours. Thereafter, 20 g of a thermal initiator (2,2'-azobis(N-butyl-2-methylpropionamide, product name: Vam-110) was added, and stirring was performed for 3 hours to prepare a first solution (A).

[Preparation Example 2] Second Solution Including Alicyclic Epoxidized Silsesquioxane-Based Compound 2-(3,4-epoxycyclohexyl)ethyltrimethoxysilane (ECTMS, TCI) and water were mixed at a ratio of 24.64 g:2.70 g (0.1 mol: 0.15 mol) to prepare a reaction solution, which was added to a 250 mL 2-neck flask. 0.1 mL of a tetramethylammonium hydroxide catalyst and 100 mL of tetrahydrofuran were added to the mixture and stirring was performed at 25° C. for 36 hours. Thereafter, layer separation was performed, a product layer was extracted with methylene chloride, moisture was removed from an extract with magnesium sulfate, and the solvent was dried under vacuum to obtain an epoxysilsesquioxane-based resin.

A second solution in which 30 g of the epoxy siloxane-based resin prepared as described above, 10 g of (3',4'-epoxycyclohexyl)methyl 3,4-epoxycyclohexanecarboxylate, 5 g of bis[(3,4-epoxycyclohexyl)methyl]adipate, and 54.5 g of methylethyl ketone were mixed was prepared.

[Preparation Example 3] Preparation of First Solution (B) Including Acrylic Compound 171 g of PU9020 (containing 30% of butyl acetate, Miwon Specialty Chemical Co., Ltd.) and 280 g of UA5095X2 (Miwon Specialty Chemical Co., Ltd.) were mixed, and then 140 g of methylethyl ketone (MEK) was added so that a solid content was 70 wt % and stirring was performed for 5 hours. Thereafter, 20 g of Irgacure (918) was added, and stirring was performed for 2 hours to prepare a first solution (B).

Example 1

The first solution (A) and the second solution prepared in Preparation Example 1 and Preparation Example 2 were mixed at a weight ratio of 30:70, and stirring was performed for 3 hours to prepare a mixed solution. Thereafter, the mixed solution was coated on one surface of a glass substrate (UTG 100 μm) with a #20 layer bar and dried at 50° C. for 2 minutes. Thereafter, an ultraviolet ray of 300 mJ/cm$^2$ was irradiated, and a heat treatment at 150° C. for 10 minutes was performed to produce a glass substrate multilayer structure having a single layer dualized structure having a thickness of 6 μm.

Comparative Example 1

A glass substrate multilayer structure was produced in the same manner as in Example 1, except that the first solution (B) prepared in Preparation Example 3 was used instead of the first solution (A) prepared in Preparation Example 1.

The physical properties of the glass substrate multilayer structures produced in Example 1 and Comparative Example 1 were measured, and are shown in the following Table 1.

TABLE 1

| | Composition of mixed solution for forming coating layer | Phase separation | Number of layers and layer thickness | | Surface hardness | Impact resistance properties |
|---|---|---|---|---|---|---|
| Example 1 | First solution (A) + second solution | ○ | First layer (acryl cured layer) 2.5 μm | Second layer (epoxy cured layer) 3.5 μm | 3H | ◎ |
| Comparative Example 1 | First solution (B) + second solution | X | Single layer/6 μm | | HB | ◎ |

Figure 2:
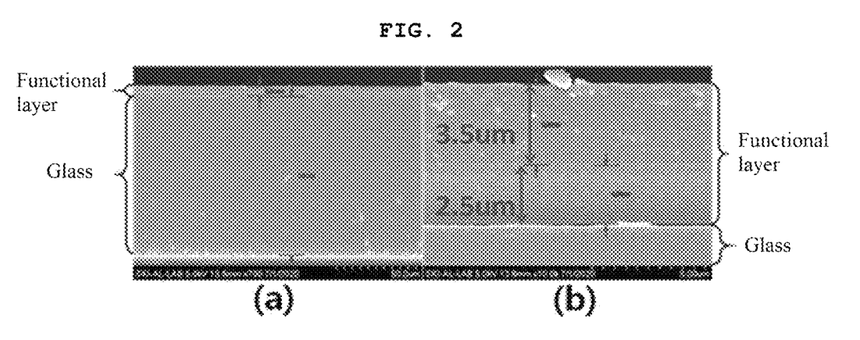
FIG. 2 is a field emission scanning electron microscope (Fe-SEM) photograph of a cross-section of the glass substrate multilayer structure according to Example 1, in which (a) shows a cross-section of the glass substrate multilayer structure as an FE-SEM photograph, and (b) is an enlarged FE-SEM photograph of the functional layer (coating layer) of (a).

As shown in Table 1 and FIG. 2, in Example 1, it was found that phase separation occurred by sequential curing of ultraviolet curing and thermal curing, and a dualized layer was formed by a single coating. In addition, it was found in FIG. 2 that a mixed layer was present in an interlayer of each layer. Moreover, it was confirmed that a functional layer having an excellent surface hardness of 3H may be formed only by a single coating.

Figure 3:
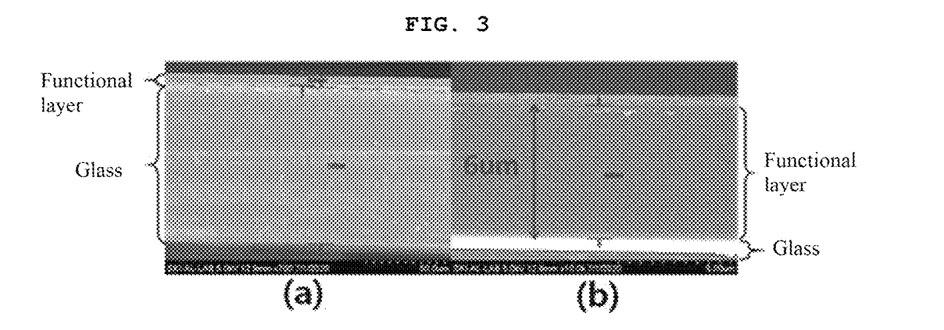
FIG. 3 is a field emission scanning electron microscope (Fe-SEM) photograph of a cross-section of the glass substrate multilayer structure according to Comparative Example 1, in which (a) shows a cross-section of the glass substrate multilayer structure as an FE-SEM photograph, and (b) is an enlarged FE-SEM photograph of the functional layer (coating layer) of (a).

However, the glass substrate multilayer structure produced in Comparative Example 1 was formed as a single layer as in FIG. 3, and the surface hardness was HB, which was significantly poor.

The glass substrate multilayer structure disclosed in the present invention includes a functional layer formed on at least one surface of a flexible glass substrate. The functional layer is a phase-separated layer formed by a single coating, and though it is a very thin coating layer of 10 μm or less as compared with a conventional shatter-proof layer formed of an acrylic compound, a shatter-proof functional layer and a hard coating functional layer are implemented at the same time, and thus, it has significantly improved shatter resistance and impact resistant properties, excellent flexibility, and excellent ball drop properties, thereby having an effect appropriate for a flexible display window.

An exemplary embodiment of the present invention may be achieved by applying and curing a mixed solution including an acrylic compound and a silane compound, for example, an epoxidized silsesquioxane-based compound as the functional layer, thereby curing the acrylic compound and the silane compound by phase separation into two layers in a drying process and/or a curing process after coating.

In an exemplary embodiment of the present invention, the phase separation mixture may be exemplified as a mixture comprising an acrylic compound and a silane compound, for example, a mixture comprising an acrylic monomer compound and an epoxidized silsesquioxane-based compound, but as a method of deriving phase separation, various methods such as phase separation in a drying or curing process or both processes by a difference in polarity or miscibility of compounds forming the mixture may be applied, and thus, the phase separation is not limited as long as the mixture may be phase-separated.

In an exemplary embodiment of the present invention, when the layer is phase-separated in a drying or curing process to be divided into two layers, the function of a hard coating layer may be distinguished from the function of a shatter-proof layer by deriving a curing reaction of the compound forming a hard coating to crosslink the compound.

In an exemplary embodiment of the present invention, an example of the functional layer imparting the functions of the shatter-proof layer and the hard coating layer by a single coating as such is not particularly limited, but the functional layer is obtained by coating a mixed solution of a compound including an acrylic monomer and an epoxidized silsesquioxane-based compound on a flexible glass substrate and performing drying or curing.

In addition, in an exemplary embodiment of the present invention, a first solution including an acrylic compound and a second solution including an epoxidized silsesquioxane-based compound are solution-mixed, and the mixed solution is applied on a flexible glass substrate and cured, thereby implementing a dualized layer at once by phase separation.

The dualized functional layer has a mixed layer between each layer, thereby further enhancing adhesiveness and implementing a smaller thickness of the functional layer. Therefore, interlayer adhesion may be further improved and also surface hardness properties are excellent to decrease an occurrence of defects on the surface.

Moreover, unlike the present invention, when a shatter-proof layer which is another form studied by the present inventors is constructed as a thick film by a lamination, a surface hardness after lamination is deteriorated, and when a process of further forming a hard coating layer is performed for supplementing this, the thickness is increased and the adhesive strength of an interface is not sufficient.

However, though the glass substrate multilayer structure of the present process is formed by a thin coating by a method of coating a thin film, it has an effect of forming a layer imparting the surface hardness properties of the substrate itself while retaining shatter resistance and impact resistant properties by phase separation to provide a glass substrate multilayer structure which is thin and has excellent adhesive strength and surface properties.

In an exemplary embodiment of the present invention, as for the polymerization or curing reaction of the compound forming the shatter-proof layer, the acrylic compound may be thermally cured by an initiator or photocured using a photoinitiator, the epoxy-based silsesquioxane-based compound may be cured by a catalyst, thermally cured, or photocured, and each layer of the functional layer may be reacted or cured simultaneously or sequentially by the same method or different methods from each other.

Moreover, the glass substrate multilayer structure according to the present invention implements a shatter-proof layer or a hard coating layer by a single coating, thereby simplifying a process step to reduce manufacturing costs, and also improves surface hardness properties of a glass multilayer structure.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A flexible glass substrate multilayer structure comprising:
    a flexible glass substrate; and
    a functional layer formed on at least one surface of the flexible glass substrate,
    wherein the functional layer is phase-separated in a drying or curing process after a single coating and formed into two or more layers,
    wherein the functional layer comprises an acrylic resin layer, a mixed layer, and an epoxy-based silane resin layer in that order.

2. The flexible glass substrate multilayer structure of claim 1, wherein the functional layer is formed by applying a mixture comprising an acrylic compound and a silane-based compound.

3. The flexible glass substrate multilayer structure of claim 1, wherein the glass substrate has a thickness of 1 μm to 100 μm.

4. The flexible glass substrate multilayer structure of claim 1, wherein the functional layer has a thickness of 1 μm to 10 μm.

5. The flexible glass substrate multilayer structure of claim 1, wherein the glass substrate multilayer structure has a pencil hardness according to ASTM D3363 of 3H to 5H.

6. The flexible glass substrate multilayer structure of claim 1, wherein the functional layer is formed by mixing an acrylic compound and an alicyclic epoxy silsesquioxane-based compound.

7. A flexible display panel comprising the glass substrate multilayer structure of claim 1.

8. A method of producing a flexible glass substrate multilayer structure, the method comprising:
    applying a composition for forming a functional layer on one surface of a flexible glass substrate; and
    curing the applied composition for forming a functional layer to form a phase-separated functional layer,
    wherein the phase-separated functional layer comprises an acrylic resin layer, a mixed layer, and an epoxy-based silane resin layer in that order.

9. The method of producing a flexible glass substrate multilayer structure of claim 8, wherein the composition for forming a functional layer is formed by applying a mixture comprising an acrylic compound and an alicyclic epoxidized silsesquioxane-based compound.

10. The method of producing a flexible glass substrate multilayer structure of claim 8, wherein the curing is thermal curing after light irradiation.

* * * * *